L. FIGARSKY.
SOFT COLLAR HOLDER.
APPLICATION FILED OCT. 1, 1920.

1,425,953.

Patented Aug. 15, 1922.

WITNESSES:
Morris W. Hart.
Pauline Kaufman.

INVENTOR
BY Louis Figarsky
Abraham Aaron
ATTORNEY

UNITED STATES PATENT OFFICE.

LOUIS FIGARSKY, OF BROOKLYN, NEW YORK.

SOFT-COLLAR HOLDER.

1,425,953.  Specification of Letters Patent.  Patented Aug. 15, 1922.

Application filed October 1, 1920. Serial No. 413,980.

*To all whom it may concern:*

Be it known that I, LOUIS FIGARSKY, a citizen of the United States, and a resident of the borough of Brooklyn, county of Kings, city and State of New York, residing at No. 259 Rutledge Street, of said borough, county, city, and State, have invented a certain new and useful Improvement in Soft-Collar Holders, of which the following is a specification.

This invention relates to a soft collar holder, particularly one which is adapted to hold down the front ends or flaps of soft collars, and to keep the flaps of such collars from curling upward or spreading, thus having a neater appearance and eliminating the use of buttons or button-holes to keep the soft collar in position.

With these and other objects in view, the invention consists of certain novel features and methods of construction, as will be more fully shown and described and set forth in the claims.

In the accompanying drawings, is illustrated one form of a soft collar holder made according to my invention.

Like marks of reference refer to similar parts in the several views of the drawings.

Figure 1:
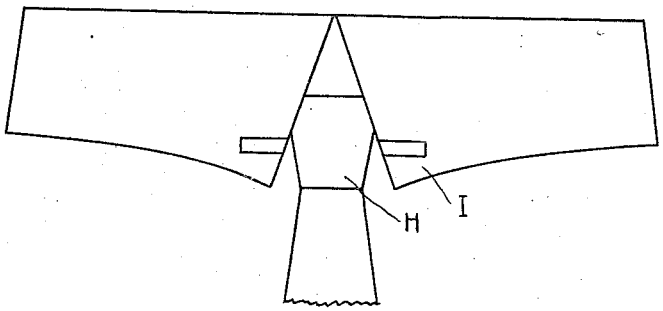
Figure 1 is a view showing the soft collar holder placed in position on my soft collar.
Figure 2:
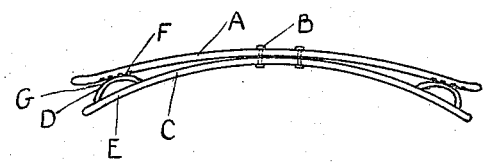
Figure 2 is a side view of my soft collar holder.
Figure 3:
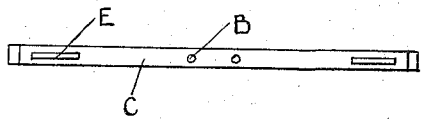
Figure 3 is a rear view of my soft collar holder.
Figure 4:
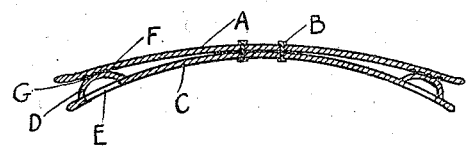
Figure 4 is a longitudinal sectional view of my collar holder.

The body of the holder is formed of bars of springy metal or celluloid A, being attached by wrapper B, to the rear bar C; and a loop D is formed having an opening at E, the loop being of the same piece of metal, as bar C. The loops D are bent upward in a semi-circular form to meet a series of grooves and teeth F, which acts as a clasp to keep the collar from slipping out of the forced opening at G into which the collar is placed and held in position by the bar C, pressing against the bar A, forcing the loop D against the bar A at F. H, shows the tie in position over A. I shows the flaps of the collar inserted at the opening G, thus holding said front flaps of soft collar in position.

If desired, instead of rivets B being used to keep the bars A and C together, ordinary solder may be used. Further, if deemed expedient, the grooves and teeth F may be eliminated and a flat surface used at G in case the grooves and teeth cause a soft collar of delicate material to be injured in any way.

My soft collar holder may also, as above stated, be constructed of celluloid, and instead of rivets B being used, ordinary celluloid cement may be used to hold the bars A and C together.

It may also be desirable to construct my invention of partly celluloid and partly metal, i. e., bar A being celluloid and bar C being metal or vice versa, and in that event the bars A and C would be riveted.

In addition to my invention, referred to herein being used for soft collars, it may also be used for collars having a soft front and a stiff or starched collar back, or an entirely stiff or starched collar.

It should be noted that the bars, in the construction of my invention shown, have sufficient gripping power and strength at the ends with a loop to hold the collar in place and in order that the collar may be withdrawn, the finger tips may be inserted at the ends and the loop loosened from the upper bar, thus allowing the collar to be inserted or released without being torn or injured in any way.

It is evident that many changes and modifications may be made in the construction of the particular parts of my said improved soft collar holder; or the construction of the same may be varied without departing from the scope of my invention; wherefore I do not intend to limit myself strictly to the construction or combination and arrangement shown, and may make any mechanical change to which my invention is susceptible.

It may be found to be more expedient, where a stronger grip is desired by the loop D at F, to have two loops constructed instead of one, as shown herein.

I claim:

1. A soft-collar holder comprising two bars of highly resilient elastic material rigidly secured together at their common centers; one of the bars being provided adjacent to each end with a securing-loop formed integral with the bar at either end by being struck up therefrom; the surface of the unlooped bar abutting against the loops being provided with collar securing teeth; and such toothed bar being held under tensional strain against its own resiliency by such projecting loops.

2. A soft-collar holder comprising two bars of highly resilient elastic material rigidly secured together at their common centers; one of the bars being provided adjacent to each end with a securing-loop formed integral with the bar at either end by being struck up therefrom; the surface of the unlooped bar abutting against the loops being provided with collar securing teeth; and such toothed bar being held under tensional strain against its own resiliency by such projecting loops; the outer ends of the loops being located a short distance within the end of the bar from which it is formed to facilitate the forcing of the bars apart in putting the device upon and withdrawing from the collar.

3. A soft-collar holder comprising similarly curved bars of thin, highly resilient elastic material nesting one into the other rigidly secured together at their common centers; the inner bar being provided adjacent to each end with a securing-loop formed integral with the bar at either end by being struck up and out from the convex face nesting in the other bar; the surface of the unlooped bar abutting against the loops, being provided with collar securing teeth; and such toothed bar being held under tensional strain against its own resiliency by the loops of the other bar.

4. A soft-collar holder comprising similarly curved bars of thin, highly resilient elastic material nesting one into the other rigidly secured together at their common centers; the inner bar being provided adjacent to each end with a securing-loop formed integral with the bar at either end by being struck up and out from the convex face nesting in the other bar; the surface of the unlooped bar abutting against the loops, being provided with collar securing teeth; and such toothed bar being held under tensional strain against its own resiliency by the loops of the other bar; the outer ends of the loops being located a short distance within the end of the bar from which it is formed to facilitate the forcing of the bars apart in putting the device upon and withdrawing from the collar.

5. In a collar holder, a front plate, and a back plate comprising a central portion fast to the front plate, arms on each side of the central portion, and arches cut from the stock and raised from the planes of the arms adapted to cooperate with the front plate.

LOUIS FIGARSKY.

Witnesses:
MORRIS W. HART,
PAULINE KAUFMAN.